3,634,233
Patented Jan. 11, 1972

3,634,233
SELF-INDICATING FOAM CONCENTRATE COMPRISING SULFATE OR SULFONATE FOAMING AGENT AND pH INDICATOR
Ralph H. Hiltz, Pittsburgh, Pa., assignor to Mine Safety Appliances Company, Pittsburgh, Pa.
No Drawing. Filed Apr. 30, 1970, Ser. No. 33,518
Int. Cl. A62d 1/00; G01n 31/22
U.S. Cl. 252—3                         7 Claims

ABSTRACT OF THE DISCLOSURE

A foam concentrate containing an anionic sulfate or sulfonate foaming agent used for generating fire-fighting foams contains a colorimetric indicator that changes color between about pH 5 and pH 6. A change in color of the concentrate indicates that it is not operable for generating fire-fighting foams.

Fire extinguishing foam generating devices are now commonly being permanently installed in warehouses and other buildings on a standby basis to be automatically or manually activated in the event of a fire. In these devices, a liquid foam concentrate is mixed with water, the resultant solution is sprayed on a net or other formaminous barrier and air is blown through the net to generate a high expansion foam. It is imperative that foam concentrate in such installations perform on demand, even after long or indefinite storage.

Although foam concentrates are formulated to provide long term stability, deterioration can occur and the rate of deterioration can be affected by extrinsic factors, such as water loss from the concentrate, contamination, temperature changes and other environmental factors. It is impractical to continually chemically analyze the foam concentrate or check its performance by actual foam generation.

It is an object of this invention to provide a foam concentrate that will indicate deterioration by a color change. A further object is to provide such a foam concentrate containing anionic sulfate or sulfonate foaming agents and an indicator that changes color at between about pH 5 and pH 6.

Foam concentrates, referred to in the fire-fighter's art as air-foam concentrates, are aqueous solutions of foam promoting surfactants that may contain additives to improve foam characteristics and solubilizers or freezing point depressants, sometimes in major amounts. Additives to decrease the drainage rate of liquid from the foam are commonly used, such as fatty alcohols, particularly lauryl or myristal alcohol. As fatty acids are at best only sparingly soluble in water, organic solubilizers are also incorporated in the foam concentrate, such as lower alcohols, glycol ethers, and other oxygen containing organic solvents.

Anionic sulfates and sulfonate surfactants that propromote foaming are conventionally used in foam concentrates, usually alkane sulfates such as lauryl sulfates or myristal sulfates, or alkyl ether sulfates such as lauryl ether sulfates or myristal ether sulfates. Such surfactants have an alkali metal, alkaline earth metal, ammonium or alkanolamine cation and an organo sulfate or sulfonate anion. Alkane sulfates (sulfated alcohols) have the formula $ROSO_3M$ and alkyl ether sulfates have the formula $R(OR')_nOSO_3M$, where M is the cation, R is an aliphatic radical, R' is ethylene, methylene or propylene and $n$ varies from about 1 to 4. Other suitable surfactants include the alkane sulfonates, $RSO_3M$, alkylbenzenesulfonates, $RC_6H_4SO_3M$, naphthalene sulfonates, $$RC_{10}H_6SO_3M,$$

and alkoxylated sulfated alkylphenols, $$RC_6H_4(OCH_2OCH_2)_nOSO_3M$$

where R is an aliphatic radical, M is the cation and $n$ varies from 1 to 4. Minor amounts, up to about 10% of the sulphate or sulphonate used, of other surfactant foaming agents, such as low molecular weight alkanolamides, may be used if desired.

Foam concentrates containing anionic sulfate or sulfonate surfactants with or without fatty acid and solubilizer additives, have a pH between about 6.5 and 9. The performance of concentrates in generating a suitable high expansion foam is relatively insensitive to shifts to higher pH, but is extremely sensitive to changes to a lower pH. When the pH drops below 6, expansion is decreased and drainage rate is increased, although adequate performance can be obtained above a pH of about 5. At pH below pH 5, the performance is so diminished that a satisfactory fire-fighting foam cannot be generated. Deterioration of the surfactant results in acidification of the foam concentrate, thus causing a severe loss of performance far beyond that to be expected because of a diminished surfactant concentration.

In accordance with this invention, a pH indicator that changes color betwetn about pH 5 and 6, is incorporated in the foam concentrate. Thus, if deterioration of the surfactant acidifies the foam concentrate to an extent that would adversely affect foam generation, the indicator changes color giving a visual signal that the concentrate is not effective and should be discarded. Illustrative suitable indicators, both normal and fluorescent, include, for example, Ethyl Red, Lacmoid, Alizarine Red S, Quinine, and Brom-cresol green. Ordinarily, the use of as little as 2 milligrams per gallon of indicator is sufficient to provide a sufficient color intensity. The use of these pH indicators is satisfactory in any foam concentrate in which the anionic sulfate or sulfonate surfactants are the predominant foaming agent, suitably containing not more than about 10% of a secondary foaming agent, with or without additional organic additives. Illustrative self-indicating foam concentrates contain from about 50 to 75 parts by volume of a 30% by weight aqueous solution of ammonium lauryl sulfate, 2 to 10 parts by volume lauryl alcohol and 10 to 35 parts of solvent, such as, for example, butyl Carbitol or lower carbinols, and 2 milligrams per gallon of brom-cresol green. Another concentrate especially suitable for use with salt water consists of 50 to 75 parts by volume of a 30% by weight aqueous solution of sodium myristal ether sulfate, 2 to 10 myristal alcohol, 0 to 10 parts of an alkanolamide surfactant, such as Standamid CD or Oxynal LL, 10 to 35 parts of solvent, such as butyl Carbitol or lower carbinols, and 2 milligrams per gallon of brom-cresol green. For low temperature use it is preferred to use a high concentration of solvent and from about 5–7% of alkanoamide.

I claim:
1. A foam concentrate for generating firefighting foams comprising an aqueous solution of an anionic sulfate or sulfonate surfactant that promotes foaming and a pH indicator that changes color at a pH between 5 and 6, whereby a color change indicates ineffectiveness of the concentrate.
2. A concentrate according to claim 1 containing a fatty alcohol and an organic solubilizer for the fatty alcohol.
3. A concentrate according to claim 2 in which the surfactant is an alkane sulfate or an alkyl ether sulfate.
4. A concentrate according to claim 3 containing lauryl alcohol.
5. A concentrate according to claim 4 consisting essentially of a solution of ammonium lauryl sulfate, lauryl alcohol and pH indicator.
6. A concentrate according to claim 2 consisting essentially of a solution of sodium myristal ether sulfate, myristal alcohol, and pH indicator.
7. A concentrate according to claim 2 consisting essentially of a solution of sodium myristal ether sulfate, myristal alcohol, an alkanolamide surfactant, and pH indicator.

References Cited
UNITED STATES PATENTS

| | | | |
|---|---|---|---|
| 3,165,997 | 7/1939 | Daimler et al. | 252—3 |
| 2,196,042 | 4/1940 | Timpson | 252—3 |
| 2,416,619 | 2/1947 | Fleisher | 252—408 |
| 2,937,146 | 5/1960 | Cutlip et al. | 252—408 |
| 3,008,905 | 11/1961 | Wedell | 252—3 |
| 3,051,661 | 8/1962 | Collins | 252—408 |
| 3,186,943 | 6/1965 | Barthauer | 252—3 |
| 3,422,011 | 1/1969 | Jackovitz | 252—3 |
| 3,479,285 | 11/1969 | Barthaver | 252—3 |

OTHER REFERENCES

Hodgman et al., Handbook of Chemistry and Physics, 40th edition, Chem. Rubber Pub. Co., Cleveland, 1959 pp. 1710–1713.

JOHN T. GOOLKASIAN, Primary Examiner
D. J. FRITSCH, Assistant Examiner

U.S. Cl. X.R.
252—8.05, 408